United States Patent [19]

Anderson et al.

[11] 4,150,210

[45] Apr. 17, 1979

[54] EMULSION POLYMERIZATION OF VINYL CHLORIDE POLYMERS USING MIXED EMULSIFIER SYSTEM

[75] Inventors: Donald F. Anderson, White Plains; Stephen D. Farrington, North Tarrytown, both of N.Y.

[73] Assignee: Stauffer Chemical Company, Westport, Conn.

[21] Appl. No.: 917,058

[22] Filed: Jun. 19, 1978

[51] Int. Cl.$^2$ .................... C08F 2/28; C08L 27/06
[52] U.S. Cl. ............... 526/222; 260/29.6 R; 260/29.6 ME; 526/212; 526/225; 526/344.2; 526/911
[58] Field of Search ............... 526/212, 225, MS File; 260/29.6 R, 29.6 ME

[56] References Cited

U.S. PATENT DOCUMENTS

| | | | |
|---|---|---|---|
| 3,654,248 | 4/1972 | Iida et at. ................. | 260/29.6 R |
| 3,989,660 | 11/1976 | Goldsworthy et al. .... | 260/29.6 MQ |
| 4,029,619 | 6/1977 | Tajima et al. ............. | 260/23 X |
| 4,046,730 | 9/1977 | Tortai ....................... | 260/29.6 RB |
| 4,071,675 | 1/1978 | Yu et al. ................... | 526/212 |
| 4,093,581 | 6/1978 | Anderson .................. | 260/29.6 MH |

*Primary Examiner*—John Kight, III
*Attorney, Agent, or Firm*—Richard P. Fennelly

[57] ABSTRACT

A one-step process is disclosed for the emulsion polymerzation of vinyl chloride, optionally in the presence of copolymerizable comonomers, using a water-soluble initiator or initiator system and a mixed emulsifier of: (1) at least one $C_{12}$–$C_{18}$ straight chain alkyl or alkenyl surfactant, such as sodium lauryl sulfate; (2) at least one $C_{14}$–$C_{20}$ straight chain alkyl or alkenyl alcohol, such as stearyl alcohol; and (3) at least one $C_5$–$C_8$ straight alkyl chain sulfosuccinate emulsifier; such as, sodium diamyl sulfosuccinate and sodium dihexyl sulfosuccinate. The presence of the sulfosuccinate emulsifier allows the reaction to be run at lower temperatures than possible using just the other two components of the emulsifier with production of a polymer latex having good mechanical stability. The polymer product is useful as a plastisol or organosol resin.

9 Claims, No Drawings

EMULSION POLYMERIZATION OF VINYL CHLORIDE POLYMERS USING MIXED EMULSIFIER SYSTEM

BACKGROUND OF THE INVENTION

1. Field of the Invention

The present invention is a single step process for the formation of vinyl chloride polymers by emulsion polymerization in an aqueous reaction medium using a water soluble initiator and a mixed emulsifier system.

2. Description of the Prior Art

The use of a single step, or non-seed growth, process for the emulsion polymerization of vinyl chloride using a water-soluble initiator and a mixed emulsifier system is known. For example, in pending U.S. Ser. No. 740,990 of Paul Kraft, it is taught that such a system can be used to yield a resin product that is suitable for use as a plastisol or organosol resin without the need to use conventional seed polymerization procedures. In conventional seed polymerization (such as shown in U.S. Pat. Nos. 3,642,740 and 3,755,225), the product is formed by a two-step process involving: (1) an initial seed formation step; followed by (2) a seed growth step, wherein additional monomer is polymerized in the presence of the previously formed seed particles.

Also, in pending U.S. Ser. No. 740,989, in the name of Donald F. Anderson, an improved single step emulsion polymerization process using a mixed emulsifier system is described. In this process, a mixed emulsifier similar to the one shown in Kraft U.S. Ser. No. 740,990, is present in the reaction medium, when the polymerization reaction is initiated, as a prehomogenized or premixed solution to yield a more reproducible process and one which yields a latex of polymer particles having better mechanical stability. The latex which is produced in this improved process contains a greater proportion of polymer particles having a size in the desired range of from about 0.6 to about 0.7 microns which, when dissolved in plasticizer, also yields a plastisol or organosol having superior physical properties in regard to the stability of the resin to mixing forces. It is desirable in commercial operations that any latex be resistant to coagulation of the polymer particles when mixing forces are applied thereto. Coagulation causes undesired inhomogenity in the latex which adversely affects the flowability characteristics of such solutions. Also, when the resin product is added to plasticizer to form a plastisol or organosol, it is desirable for such solutions to exhibit low viscosity characteristics so that they can be easily manipulated in commercial operations.

Although both of the aforementioned pending applications describe single step (or "one shot") procedures which have superiority over conventional two-step seed polymerization techniques, it has been found that polymerization using such single step processes, under certain temperature conditions, can lead to a deterioration in the resulting latex. For example, lowering of the polymerization temperature from about 60° C. to about 45° C. can, under certain circumstances, result in a deterioration of the quality of the latex when the aforementioned one-step, mixed emulsifier systems are employed.

SUMMARY OF THE PRESENT INVENTION

It has now been found possible to improve the aforementioned single-step polymerization of vinyl chloride, using a water-soluble initiator and the types of mixed emulsifiers described in the two aforementioned U.S. patent applications, by including a third type of compatiblizing emulsifier in the mixed emulsifier system. The presence of this third type of emulsifier allows for polymerization of the vinyl chloride in a single step process at lower temperatures without unacceptable deterioration of either the mechanical stability of the polymer latex that is produced or of the plastisol or organosol properties of the resulting product.

The present invention relates to a single step, emulsion polymerization process utilizing a water-soluble initiator which comprises the use of a mixed emulsifier of: (1) at least one $C_{12}$–$C_{18}$ straight chain alkyl or alkenyl surfactant, such as sodium lauryl sulfate; (2) at least one $C_{14}$–$C_{20}$ straight chain alkyl or alkenyl alcohol, such as stearyl alcohol; and (3) at least one $C_5$–$C_8$ straight alkyl chain sulfosuccinate emulsifier, such as sodium diamyl sulfosuccinate or sodium dihexyl sulfosuccinate. The polymer product that is produced by the reaction is useful as a plastisol or organosol resin.

DESCRIPTION OF THE PREFERRED EMBODIMENTS

The polymerization medium of the present invention is an aqueous reaction medium which contains effective amounts, for the desired polymerization, of: vinyl chloride monomer (and, optionally, comonomers); a water-soluble initiator or initiator system; a mixed emulsifier; and, if desired, a buffer.

The vinyl chloride monomer comprises at least about 50%, preferably at least about 85%, by weight of the entire monomeric component. It can, if desired, be the sole monomer that is present. However, copolymers may be advantageously prepared in accordance with this invention. For example, copolymerizable mixtures, containing vinyl chloride and up to about 49%, by weight of the reactive monomers, of vinyl acetate, but preferably in the range of from about 5 to about 10%, by weight vinyl acetate, may be employed. Other monomers that are copolymerizable with vinyl chloride monomer, which may be used in accordance with this invention, include: the vinyl esters of other alkanoic acids, such as vinyl propionate, vinyl butyrate, and the like; the vinylidene halides, such as vinylidene chloride; the vinyl esters of aromatic acids, such as, vinyl benzoate; the esters of alkenoic acids, such as, those of unsaturated monocarboxylic acids, such as methyl acrylate, 2-ethylhexyl acrylate, and the corresponding esters of methacrylic acid; and the esters of alpha, beta-ethylenically unsaturated dicarboxylic acids, for example, the methyl, ethyl, propyl, butyl, amyl, hexyl, heptyl, octyl, allyl, methallyl and phenyl esters of maleic, itaconic, and fumaric acids, and the like. Amides, such as acrylamide and methacrylamide, and nitriles, such as acrylonitrile, may also be suitably employed. Vinylphosphonates, such as bis(beta-chloroethyl)vinylphosphonate, may also be used as the comonomer.

The water to monomer ratio in the reaction medium can be varied widely within conventional limits with values of from about 1:5 to about 2.5:1 being useful, preferably from about 1:7 to about 2:1.

The initiator or catalyst which is used in the present invention can be any of the conventional water-soluble initiators or initiator systems which are used in the emulsion polymerization of vinyl chloride monomer. Such free radical, water-soluble initiators as the peroxygen type compounds, e.g., ammonium persulfate, sodium perborate, potassium persulfate, sodium persulfate, and potassium percarbonate are illustrative of initiators that may be employed. If desired, a redox system can be used as the initiator. Representative of such a system is a hydrogen peroxide initiator/ascorbic acid activator combination, a potassium persulfate/ascorbic acid combination, or a potassium bisulfite/ascorbic acid combination. Combinations of persulfates and bisulfites, for example, potassium persulfate and sodium metabisulfite, can also be used. The amount of said initiator which is used should be an amount which is effective to polymerize the monomers which are present in the reaction medium. Generally, from about 0.05% to about 1%, preferably about 0.075% to about 0.10%, based on the weight of polymerizable monomers, of initiator or redox system is needed.

The mixed emulsifier system of the present invention contains: (1) at least one $C_{12}$–$C_{18}$ straight chain alkyl or alkenyl surfactant; (2) at least one $C_{14}$–$C_{18}$ straight chain alkyl or alkenyl alcohol; and (3) at least one $C_5$–$C_8$ straight chain alkyl sulfosuccinate emulsifier.

The $C_{12}$–$C_{18}$ straight chain surfactant which is useful in practicing the present invention has either the formula:

where R is a $C_{12}$–$C_{18}$ straight chain alkyl or alkenyl group and A is an alkali metal, alkaline earth metal or alkanolamine containing up to 6 carbon atoms. Representative alkali metal cations are sodium, potassium and (for purposes of this invention) ammonium. A representative alkali metal cation is sodium. Exemplary surfactants for use in the present invention include sodium lauryl sulfate, sodium tridecyl sulfate, sodium myristyl sulfate, sodium cetyl sulfate and sodium stearyl sulfate. Also suitable are compounds otherwise similar to any of the foregoing but where sodium is replaced by potassium, calcium, ammonium or alkanolamines of up to six carbon atoms. Compatible mixtures of any of the foregoing surfactants can be used.

The $C_{14}$–$C_{20}$ straight chain alkyl or alkenyl alcohols which are to be used as the second component in the mixed emulsifier system of the present invention include such alcohols as cetyl alcohol, oleyl alcohol, stearyl alcohol and eicosanol. Compatible mixtures of any of the foregoing second components of the mixed emulsifier can be used.

The $C_5$–$C_8$ straight alkyl chain sulfosuccinate emulsifiers which are intended to be the novel third component in the mixed emulsifier system of the present invention are defined by the structural formula:

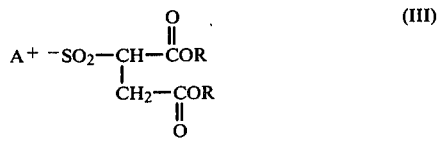

where R is independently a $C_5$–$C_8$ straight chain alkyl group such as amyl, hexyl and octyl, and A has the meaning given above in formulae I and II. Representative sulfosuccinates include sodium diamyl sulfosuccinate and sodium dihexyl sulfosuccinate. These types of emulsifiers are commercially available as emulsifier solutions, for example, under the trademarks AEROSOL from American Cyanamid and MONAWET from Mona Industries, Inc.

The components of the present mixed emulsifier system can be present as a premixed or prehomogenized "mixture" when the polymerization reaction is initiated. This insures a more reproducible process where a greater proportion of the resulting polymer particles are in a more narrow (and desired) particle size range, e.g., from 0.6 to 0.7 micron. The premixing or prehomogenization step can be conducted in any type of mixing apparatus which is capable of forming a stable homogenized solution of all three types of components. If desired, the prehomogenization can be conducted in the polymerization reactor itself before the other polymerization reagents are added to it.

The alkyl chain length of the respective three types of components of the present mixed emulsifier can be varied to obtain the type of product desired. It has been found, for example, that use of carbon chain lengths lower than $C_{14}$ for the alkyl or alkenyl alcohol will yield a system which does not produce the results desired. The use of alkyl chain lengths higher than $C_{20}$ requires an unacceptably high temperature if any preliminary prehomogenization step is desired, since such materials are solid and need to be melted and maintained in melted condition so that a stable solution is produced. A reduction of the alkyl chain length below the specified desired ranges for either the surfactant or sulfosuccinate component will tend to yield a latex of too many larger particles having poor mechanical stability, whereas an increase above the desired range will yield an undesirable number of small resin particles and will also lead to a decrease in mechanical stability.

The amount of such a mixed emulsifier system which is used in the polymerization system must be sufficient to maintain a stable emulsion in the reaction environment. Generally from about 0.7% to about 3%, based on the weight of copolymerizable monomer or monomers, is sufficient, with the amount generally being in the range of from about 0.8% to about 2%, by weight. The weight ratio of the second alcohol component to the total amount of surfactant and emulsifier is generally in the range of from about 3:1 to about 1:2, with higher relative levels of the former being preferred as giving particles of the desired larger size. A decrease in the relative ratio of the former leads to an undesired decrease in both polymer particle size and mechanical stability. The surfactant to emulsifier ratio can be from about 2:1 to 1:2, with the latter being preferred. A relative excess of the sulfosuccinate emulsifier in this ratio leads to a desired increase in the particle size of the product.

The polymerization reaction is conducted by heating the reaction mixture at an appropriate temperature and for an appropriate length of time to affect polymerization of the monomers. Representative temperatures range from about 45° C. to about 60° C. with polymerization times of from about 10 to about 5 hours being employed. It is generally preferred to add suitable buffers, e.g., borax, the alkali metal hydroxides, and the like, to maintain a pH in the reaction medium of from about 5 to about 8 so as to yield a latex having the desired properties and to insure a reduction in polymer plateout on the interior walls of the reactor.

The following Examples illustrate certain embodiments of the present invention.

(COMPARATIVE) EXAMPLE 1

This Example is presented for comparative purposes and illustrates the results that are obtained when the two-component emulsifier of the prior art is employed to make PVC homopolymer resin.

The reaction medium contained the following ingredients in the following weight amounts:

| Ingredients | Amount (in gm.) |
|---|---|
| Vinyl chloride monomer | 2190 |
| Sodium lauryl sulfate (30 wt. %) aqueous solution | 58 |
| Stearyl alcohol | 17.5 |
| Potassium bisulfite coinitiator | 3.2 |
| Disodium acid phosphate buffer | 7.6 |
| Sodium diacid phosphate buffer | 0.8 |
| Water | 5110 |
| Ascorbic acid coinitiator (in 200 ml. H$_2$O) | 2.07 |
| Sodium hydroxide | 1.0 |

The reaction was conducted by first preparing, at 65° C., a premix of the sodium lauryl sulfate, stearyl alcohol, water, and the phosphate buffers. This emulsion was added to the reactor, and the temperature in the reactor was cooled below 45° C. with agitation being supplied to the mixture. The persulfate coinitiator was then added, and the reactor was purged three times with nitrogen to remove oxygen from the intended reaction area. The vinyl chloride monomer was added without agitation being supplied to the mixture, and the temperature was then brought to 45° C., with resumption of agitation. The ascorbic acid coinitiator solution was then pumped into the reactor at 100% of the pump capacity (136 ml./hr.) for six minutes, and the pumping rate was reduced to 10% of capcacity. The pressure in the reactor at the beginning of the reaction was 5.48 kg./cm.$^2$. It fell to 4.57 kg./cm.$^2$ after three hours, and the pump was shut off at this point. The reactor was vented to conventional recovery equipment and the latex product was recovered. The reaction produced 6 grams of coagulum.

EXAMPLES 2-4

These Examples illustrate three differing embodiments in accordance with the present invention for making PVC homopolymer resin. The same general procedure used in Example 1 was employed using the following ingredients in each reaction:

| Ingredients | Amount (in grams) |
|---|---|
| Vinyl chloride monomer | 3000 |
| Disodium acid phosphate buffer | 7.6 |
| Sodium diacid phosphate buffer | 0.8 |
| Potassium persulfate coinitiator | 5.0 |
| Water | 4300 |
| Ascorbic aicd coinitiator solution | 7.0 |
| Sodium hydroxide buffer | 2.0 |

The premixed emulsifiers in each of Examples 2-4 comprised the following ingredients:

| Ingredients | Amount (in grams) | | |
|---|---|---|---|
| | Ex. 2 | Ex. 3 | Ex. 4 |
| Sodium lauryl sulfate ("SLS") (30 wt. % solution) | 40 | 40 | 40 |
| Stearyl alcohol ("SA") | 24 | 24 | 24 |
| Sodium dihexyl sulfosuccinate ("SHS") (10 wt. % solution) | 180 | 270 | 270 |

The Table given below describes the physical properties for the resins from Examples 2-4 compared to the prior art product of Example 1. The percent of the components in the mixed emulsifier, based upon the weight amount of monomer to be polymerized, is given below as well as the mechanical stability of the latex.

The mechanical stability of the latex was measured by placing 150 ml. of the latex in a blender (Hamilton Beach Mixer, Model No. 936) and agitating the latex at a low speed until the latex coagulated. The time until coagulation occurs was recorded. Longer periods of time are desired since they indicate a more stable latex. Latex mechanical stability measures the tendency for the latex to coagulate when subject to shearing forces, for example, when being pumped for transfer between various locations within a commercial plant. A latex stability of no less than about 3 minutes, when tested as described above, is generally desired in such commercial operations.

| Example | % SLS/SA/SHS | Latex Mech. Stab. |
|---|---|---|
| 1 (Prior Art) | 0.8/0.8/None | 130 sec. |
| 2 | 0.4/0.8/0.6 | 193 sec. |
| 3 | 0.4/0.8/0.9 | >30 min. |
| 4 | 0.4/0.8/0.9 | >15 min. |

The resin particles after recovery from the latex by spray drying under similar conditions in each of Examples 1-4 were dispersed in plasticizer to test the viscosity and flow characteristics of a plastisol containing them. The test involved dispersing 500 gm. of resin in 300 gm. of dioctyl phthalate and placing the resulting liquid mixture in a Brookfield Model RVF Viscometer, using a No. 6 spindle, after it had been mixed until homogeneous in a mixer (Hobart N-50 model) for 5 minutes at No. 1 speed and 10 minutes at No. 2 speed. The viscosity (in poises) for the latex at spindle speeds of 2 and 20 rpm was measured. It is desirable for the viscosity values to decrease as the shear rate increases. The number given before the slash line in the following Table is the viscosity (in poises) at a spindle speed of 2 rpm, whereas the number after the line is the viscosity (in poises) at a spindle speed of 20 rpm.

| | Brookfield Viscosity RVF (2/20 rpm) | | |
|---|---|---|---|
| Example | Initial | 2 hour | 24 hour |
| 1 (Prior Art) | 1030/310 | 2650/TVM | Not measured |
| 2 | 280/120 | 750/265 | 2650/TVM |
| 3 | 450/288 | 1100/330 | TVM/TVM |
| 4 | 250/95 | 600/190 | Not measured |

The above data indicate the general superiority of the latex and polymer product of the present invention compared to the type of latex and polymer product that is produced by the prior art process.

EXAMPLES 5-10

These Examples illustrate six differing embodiments in accordance with the present invention in making PVC homopolymer resin. These Examples show the effect that changes in the spray drying and filtering techniques have on the viscosity characteristics of the final product.

The following ingredients were used in all runs:

| Ingredients | Amount (in gm.) |
|---|---|
| Reactor Charge | |
| Vinyl chloride monomer | 3000 |

| Ingredients | Amount (in gm.) |
|---|---|
| Sodium lauryl sulfate (30 wt. % solution) | 27 |
| Stearyl alcohol | 24 |
| Disodium acid phosphate buffer | 3.8 |
| Sodium diacid phosphate buffer | 0.4 |
| Water | 4250 |
| Sodium dihexyl sulfosuccinate (10 wt. % solution) | 30 (Exs. 5, 7–10) |
| Sodium diamyl sulfosuccinate (65 wt. % solution) | 46.1 (Ex. 6 only) |
| Oxidant Feed Solution* | |
| Hydrogen peroxide | 7.5 |
| Disodium acid phosphate buffer | 4.8 |
| Sodium diacid phosphate buffer | 0.5 |
| Water | To make 200 ml. |
| Reductant Feed Solution** | |
| Ascorbic acid | 5.0 |
| Sodium hydroxide | 1.25 |
| Water | To make 200 ml. |

*Example 5 used 6.0 gm., 3.8 gm. and 0.4 gm., respectively, of the first three ingredients.
**Example 5 used 4.0 gm. and 1.0 gm., respectively, of the first two ingredients.

The following procedure was used to polymerize the reactants:

1. A pre-emulsion was prepared in the reactor at 65–70° C. by mixing and agitating the water, sodium lauryl sulfate, stearyl alcohol, and sulfosuccinate. This pre-emulsion was then cooled below 45° C.

2. The reactor was evacuated three times under vacuum and each time the vacuum was broken and the interior of the reactor was purged with nitrogen gas. Vinyl chloride monomer was then added to the reactor.

3. The mixture in the reactor was brought to a temperature of about 46° C., and the oxidant and reductant feed solutions were both pumped into the reactor at equal rates (about 25% of the capacity of the pump used in Example 1).

4. The rate of exothermic reaction was controlled by adjusting the flow rates of the two feed solutions until the desired polymer latex was obtained.

The following Tables summarize certain physical property data for the products of Examples 5–10.

Table 1 describes the particular emulsifier system that was employed in each polymerization process.

Table 2 gives a description of the filtration means used to remove coagulum from said latex, and the temperature conditions in the spray drier (Niro Atomizer, Model No. 1737) to which the filtered latex was fed. The latex was fed to the spray drier at a rate which gave the outlet temperature in the Table.

Table 3 gives viscosity data for the plastisol formed from the spray dried products from Table 2.

TABLE 1

| | Emulsifier System | | |
|---|---|---|---|
| Example | % SLS | % SA | % SHS or SAS* |
| 5 | 0.27% | 0.8% | 0.8% SHS |
| 6 | 0.27% | 0.8% | 1.0% SAS |
| 7 | 0.27% | 0.8% | 0.8% SHS |
| 8 | 0.27% | 0.8% | 0.8% SHS |
| 9 | 0.27% | 0.8% | 0.8% SHS |
| 10 | 0.27% | 0.8% | 0.8% SHS |

*SAS = sodium diamyl sulfosuccinate
SHS = sodium dihexyl sulfosuccinate

TABLE 2

| Example | Mech. Stab. | Filtration | Spray Drying Conditions |
|---|---|---|---|
| 5 | 400 sec. | 32 mesh screen | 180° C. - in. 70° C. - out |
| 6 | 145 sec. | 32 mesh screen | 180° C. - in. 70° C. - out |
| 7 | 6 min. | 32 mesh screen | 180° C. - in 70° C. - out |
| 8 | 6 min. | Close woven cloth* | 180° C. - in. 70° C. - out |
| 9 | 7 min. | 32 mesh screen | 110° C. - in. 50–55° C. - out |
| 10 | 7 min. | 32 mesh screen | 180° C. - in. 70° C. - out |

*Dacron batiste Type 56.

TABLE 3

| | Brookfield Viscosity RVF, No. 1, 6 (2/20 rpm) in poises | | | |
|---|---|---|---|---|
| Example | Initial | 2 hrs. | 24 hrs. | Other - After* |
| 5 | 65/53 | 95/71 | 160/104 | 215/132-3 days |
| 6 | 40/41 | 85/62 | 155/101 | 260/142-4 days |
| 7 | 65/51 | 105/74 | 185/116 | 375/186-5 days |
| 8 | 70/56 | 110/82 | 180/117 | 380/189-5 days |
| 9 | 145/78 | 305/136 | 785/260 | 1590/417-1 week |
| 10 | 80/62 | 140/94 | 240/143 | 420/207-1 week |

*The plastisol data was normally determined when the plastisol was initially formed and after it had been allowed to stand for 2 and 24 hours. The data under the heading "Other - After" shows plastisol data after the plastisol had been allowed to stand for the indicated periods and gives a measure of the longer term viscosity stability.

EXAMPLE 11

This Example illustrates the process of the present invention in polymerizing a copolymer of 95%, by weight, vinyl chloride and 5%, by weight, vinyl acetate.

The following ingredients were used:

| Ingredients | Amount (in gm.) |
|---|---|
| Reactor Charge | |
| Vinyl chloride monomer | 2,863.4 |
| Vinyl acetate | 150 |
| Sodium lauryl sulfate (30 wt. % solution) | 25.0 |
| Stearyl alcohol | 24.0 |
| Water | 4,250.0 |
| Sodium dihexyl sulfosuccinate (80 wt. % solution) | 25.0 |
| Oxidant Feed Solution | |
| Hydrogen peroxide | 3.3 |
| Disodium acid phosphate buffer | 5.8 |
| Sodium diacid phosphate buffer | 1.6 |
| Water | 400 |
| Reductant Feed Solution | |
| Ascorbic acid | 2.25 |
| Water | 400 |

The same general procedure used in Examples 5–10 was utilized in this Example.

The following Brookfield viscosity data were obtained for a plastisol prepared from the copolymer product:

| Initial | 2 hours | 24 hours |
|---|---|---|
| 40/30 | 90/61 | 165/110 |

EXAMPLE 12

This Example illustrates the present invention used to polymerize a copolymer of 98%, by weight, vinyl chloride and 2%, by weight, of bis(beta-chloroethyl)vinylphosphonate.

The following ingredients were used:

| Ingredients | Amount (in gm.) |
|---|---|
| Reactor Charge | |
| Vinyl chloride monomer | 2,940 |
| Bis(beta-chloroethyl)vinylphosphonate monomer | 60 |
| Sodium lauryl sulfate (30 wt. % solution) | 25.0 |
| Stearyl alcohol | 24.0 |
| Water | 3,850.0 |
| Sodium dihexyl sulfosuccinate (80 wt. % solution) | 26.0 |
| Oxidant Feed Solution | |
| Hydrogen peroxide | 33 |
| Disodium acid phosphate buffer | 5.8 |
| Sodium diacid phosphate buffer | 1.6 |
| Water | 400 |
| Reductant Feed Solution | |
| Ascorbic acid | 2.2 |
| Water | 400 |

The same general procedure used in Examples 5–11 was used in this Example.

The Brookfield viscosity data for the plastisol containing the product of this process was as follows:

| Initial | 2 hours | 24 hours |
|---|---|---|
| 50/32 | 60/40 | 140/72 |

EXAMPLE 13

This Example illustrates the present invention as used to polymerize a terpolymer of 85%, by weight, vinyl chloride, 10%, by weight, vinyl acetate, and 5%, by weight, of bis(beta-chloroethyl)vinylphosphonate.

| Ingredients | Amount (in gm.) |
|---|---|
| Reactor Charge | |
| Vinyl chloride monomer | 2,550 |
| Vinyl acetate monomer | 300 |
| Bis(beta-chloroethyl)vinylphosphonate monomer | 150 |
| Sodium lauryl sulfate (30 wt. % solution) | 22.0 |
| Stearyl alcohol | 21.0 |
| Water | 4,250.0 |
| Sodium dihexyl sulfosuccinate (80 wt. % solution) | 19.0 |
| Oxidant Feed Solution | |
| Hydrogen peroxide | 2.2 |
| Disodium acid phosphate buffer | 5.8 |
| Sodium diacid phosphate buffer | 1.6 |
| Water | 400 |
| Reductant Feed Solution | |
| Ascorbic acid | 1.5 |
| Water | 400 |
| Disodium acid phosphate buffer | 1.5 |
| Sodium diacid phosphate buffer | 0.4 |

The same general procedure used in Examples 5–12 was used in this Example.

The latex resulting from the polymerization reaction had a mechanical stability of over 16 minutes.

The foregoing Examples illustrate certain embodiments of the present invention and should not be construed in a limiting sense. The scope of protection that is sought is set forth in the claims which follow.

We claim:

1. In an emulsion polymerization procedure for forming vinyl chloride homopolymers or copolymers by heating a monomer charge containing vinyl chloride in the presence of a water soluble initiator and an emulsifier to form a latex containing particles of said polymers in a single step, the improvement which comprises using as an emulsifier, a mixture of: (1) at least one $C_{12}$–$C_{18}$ straight chain alkyl or alkenyl surfactant of the formula $ROSO_3A$ or $RC(O)OA$, where R is a $C_{12}$–$C_{18}$ straight alkyl or alkenyl group and A is an alkali metal cation, alkaline earth metal cation or alkanol amine of up to 6 carbon atoms; (2) at least one $C_{14}$–$C_{20}$ straight chain alkyl or alkenyl alcohol; and (3) at least one $C_5$–$C_8$ straight alkyl chain sulfosuccinate.

2. A process as claimed in claim 1 wherein the $C_{12}$–$C_{18}$ straight chain alkyl surfactant is sodium lauryl sulfate.

3. A process as claimed in claim 1 wherein the $C_{14}$–$C_{20}$ straight chain alkyl alcohol is stearyl alcohol.

4. A process as claimed in claim 1 wherein the $C_5$–$C_8$ straight chain sulfosuccinate is sodium dihexyl sulfosuccinate.

5. A process as claimed in claim 1 wherein the amount of the emulsifier mixture which is present is from about 0.7% to about 3%, by weight, based on the amount of polymerizable monomers.

6. A process as claimed in claim 1 wherein the surfactant is sodium lauryl sulfate, the alcohol is stearyl alcohol and the sulfosuccinate is sodium dihexyl sulfosuccinate.

7. A process as claimed in claim 1 wherein the combined amount of surfactant, alcohol and sulfosuccinate ranges from about 0.8% to about 2.0% by weight of the polymerizable monomers.

8. A process as claimed in claim 1 wherein the emulsifier mixture is a prehomogenized mixture.

9. A process as claimed in claim 7 wherein the emulsifier mixture is a prehomogenized mixture.

* * * * *

UNITED STATES PATENT AND TRADEMARK OFFICE
CERTIFICATE OF CORRECTION

PATENT NO. : 4,150,210
DATED : April 17, 1979
INVENTOR(S) : Donald F. Anderson et al.

It is certified that error appears in the above-identified patent and that said Letters Patent are hereby corrected as shown below:

Col. 5, line 31, "capcacity" should be -- capacity --;

Col. 6, line 44, the heading in the Table that reads "Brookfield Viscosity RVF (2/20 rpm)" should read -- Brookfield Viscosity RVF 6 (2/20 rpm) --;

Col. 8, Table 2, the heading "Spary Drying" should read -- Spray Drying --.

Signed and Sealed this

Seventeenth Day of July 1979

[SEAL]

Attest:

Attesting Officer

LUTRELLE F. PARKER
Acting Commissioner of Patents and Trademarks